July 5, 1966 E. E. RUNNION 3,259,157
PRODUCTION OF DIMENSIONAL LUMBER FROM SMALL-DIAMETER LOGS
Original Filed July 13, 1962 14 Sheets-Sheet 1
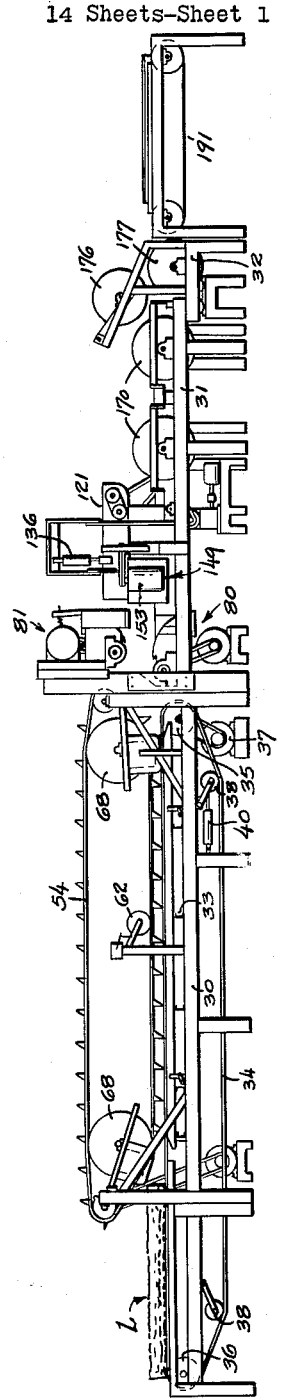
FIG__1
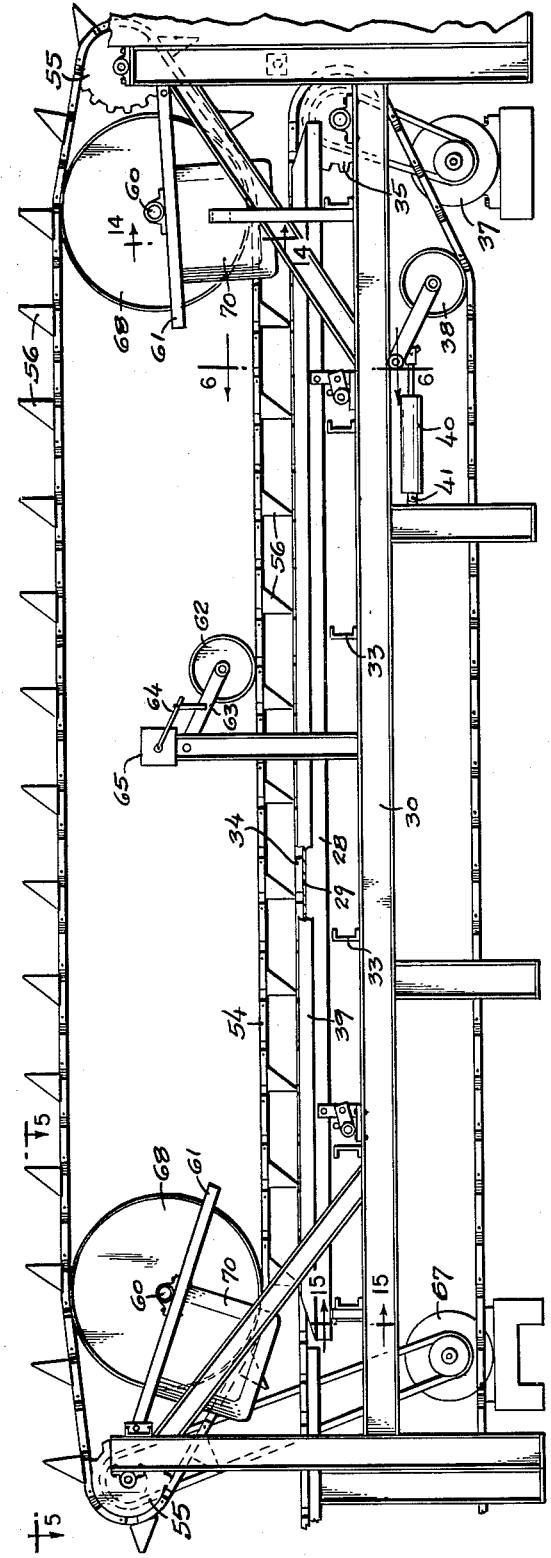
FIG__2
INVENTOR.
ERNEST E. RUNNION

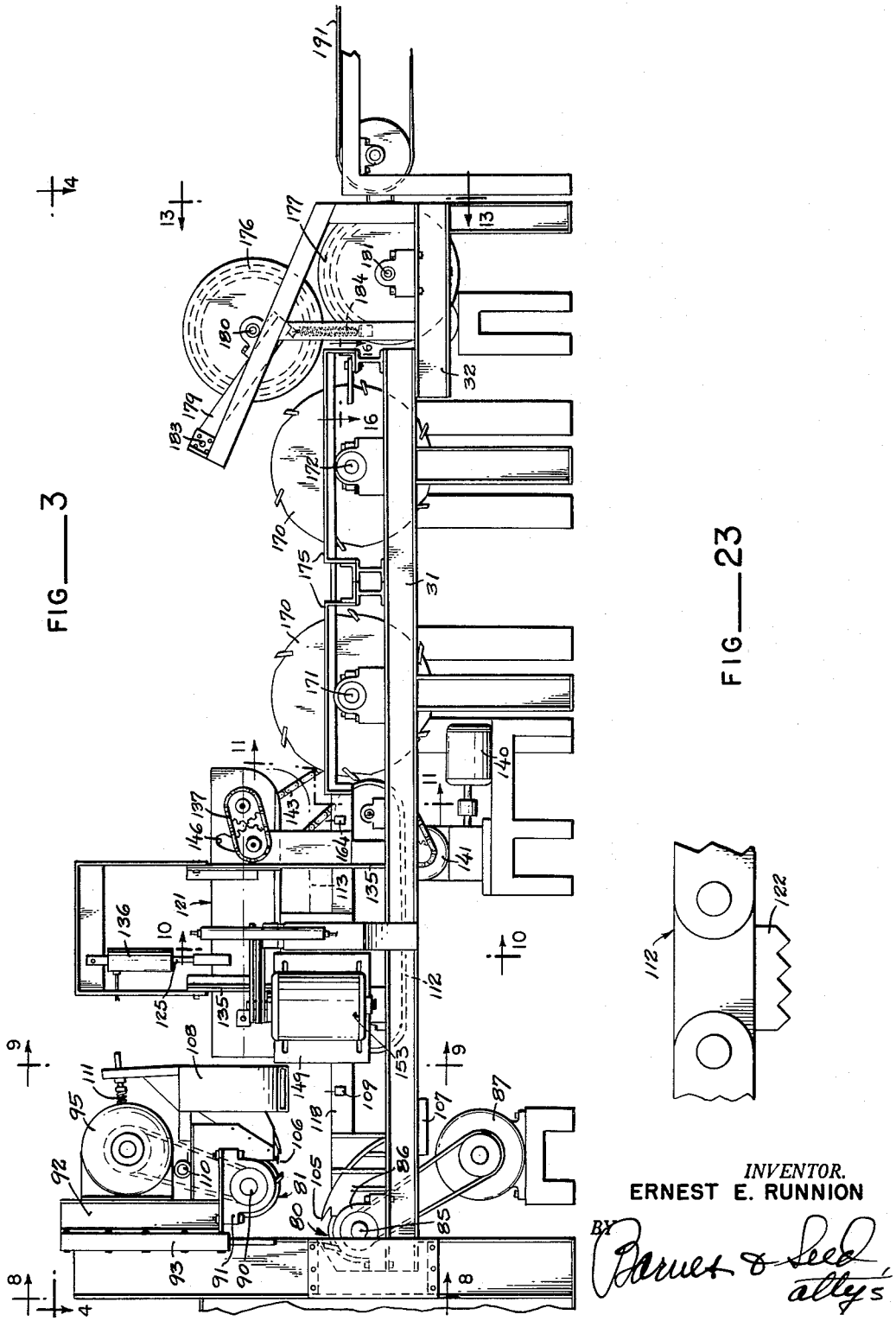

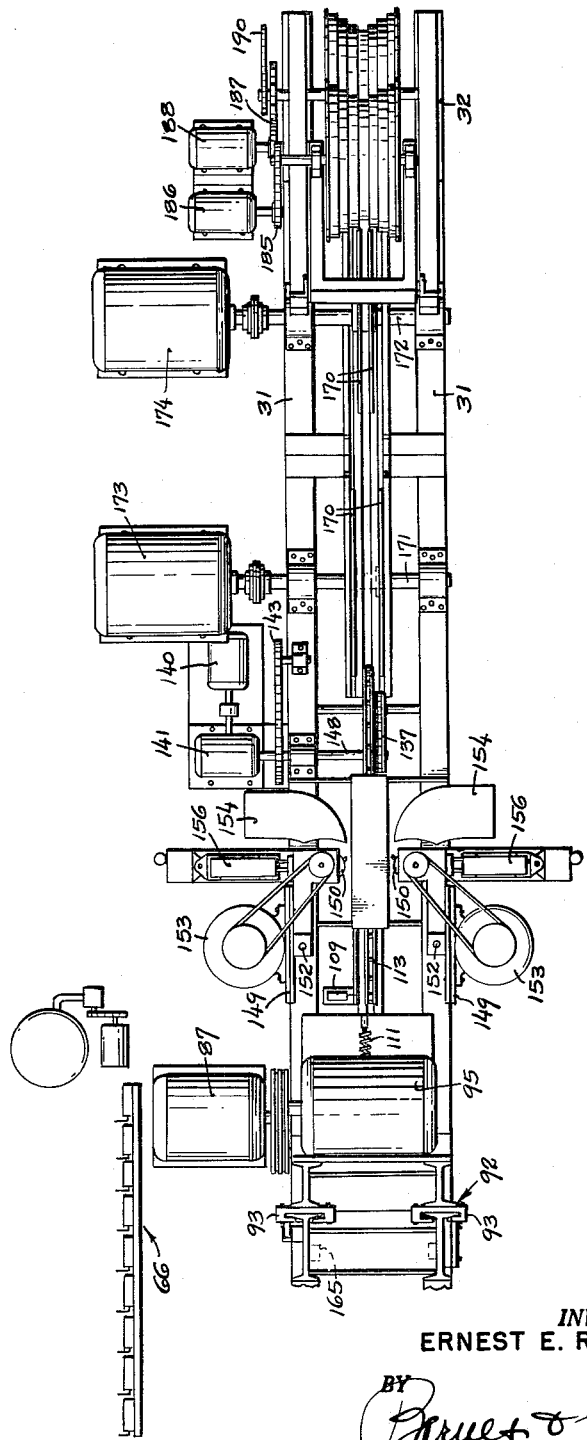
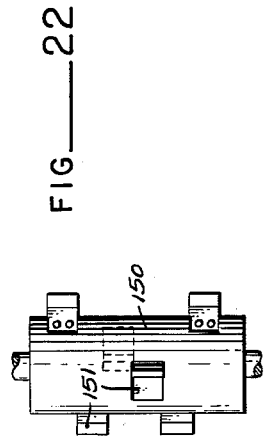

July 5, 1966 E. E. RUNNION 3,259,157

PRODUCTION OF DIMENSIONAL LUMBER FROM SMALL-DIAMETER LOGS

Original Filed July 13, 1962 14 Sheets-Sheet 4

INVENTOR.
ERNEST E. RUNNION

July 5, 1966 E. E. RUNNION 3,259,157
PRODUCTION OF DIMENSIONAL LUMBER FROM SMALL-DIAMETER LOGS
Original Filed July 13, 1962 14 Sheets-Sheet 5
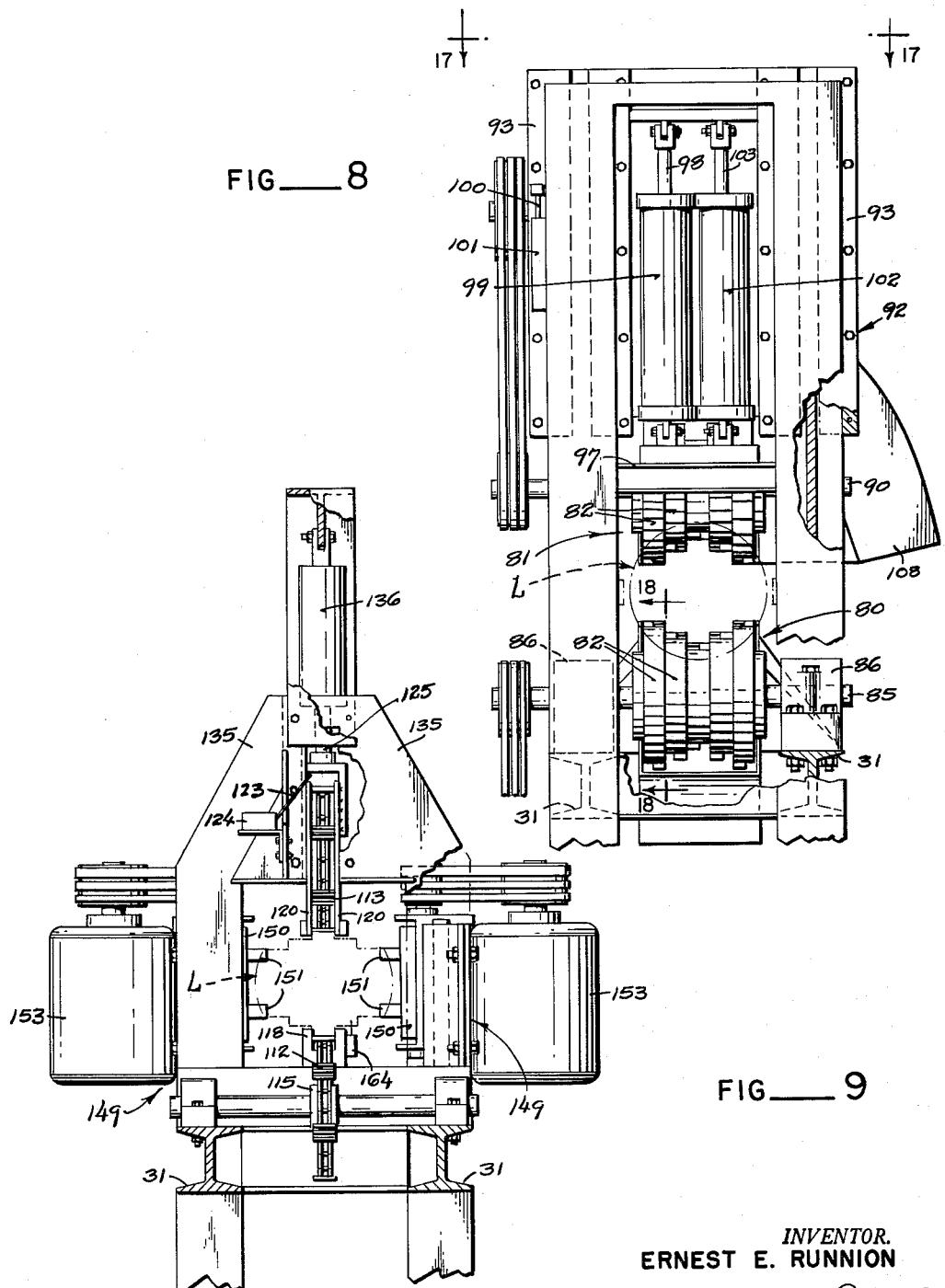
FIG__8
FIG__9
INVENTOR.
ERNEST E. RUNNION July 5, 1966  E. E. RUNNION  3,259,157
PRODUCTION OF DIMENSIONAL LUMBER FROM SMALL-DIAMETER LOGS
Original Filed July 13, 1962
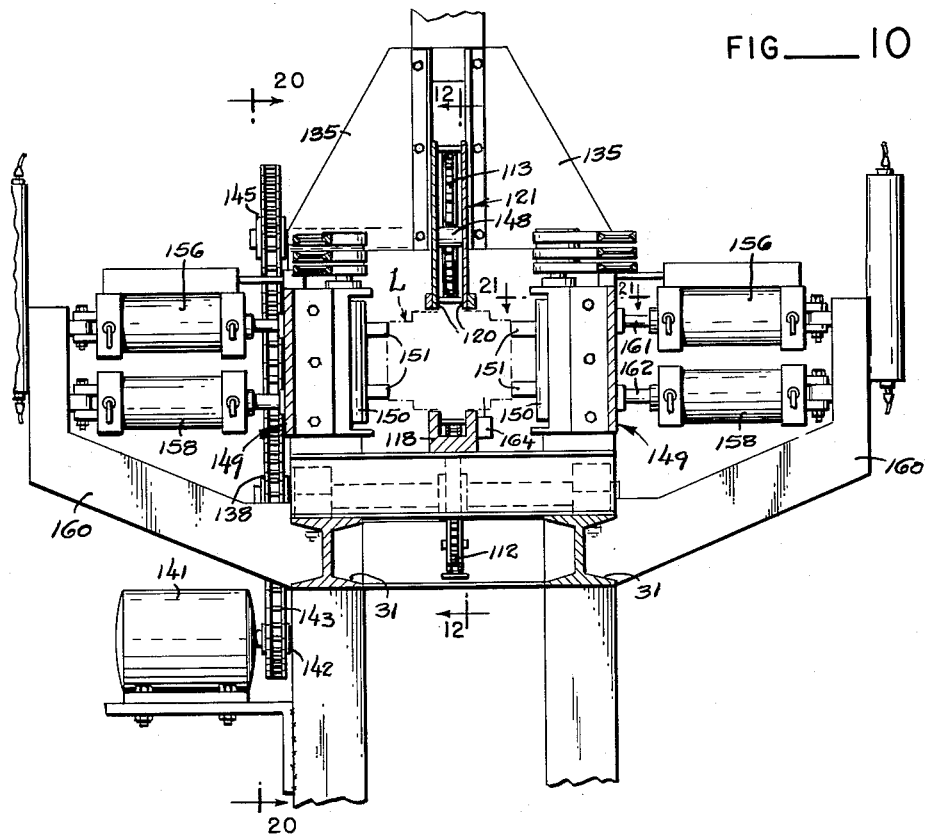
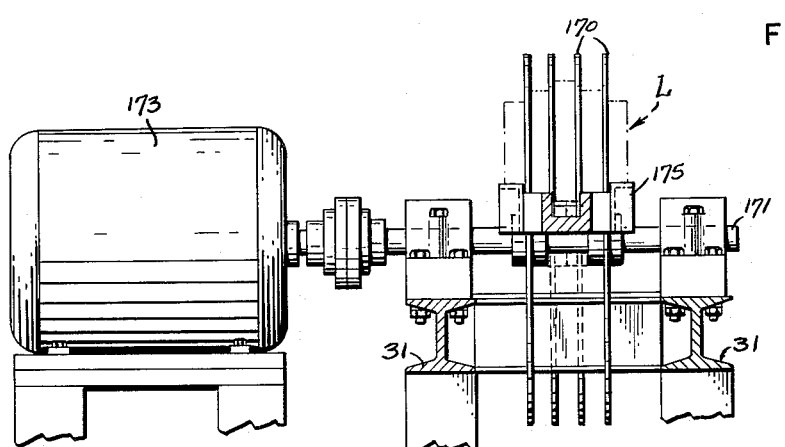
INVENTOR.
ERNEST E. RUNNION July 5, 1966 E. E. RUNNION 3,259,157
PRODUCTION OF DIMENSIONAL LUMBER FROM SMALL-DIAMETER LOGS
Original Filed July 13, 1962 14 Sheets-Sheet 7

INVENTOR.
ERNEST E. RUNNION

INVENTOR.
ERNEST E. RUNNION

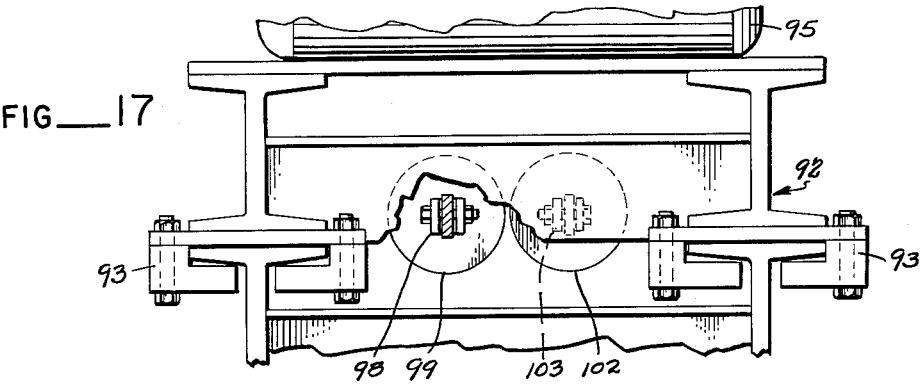
FIG.__17
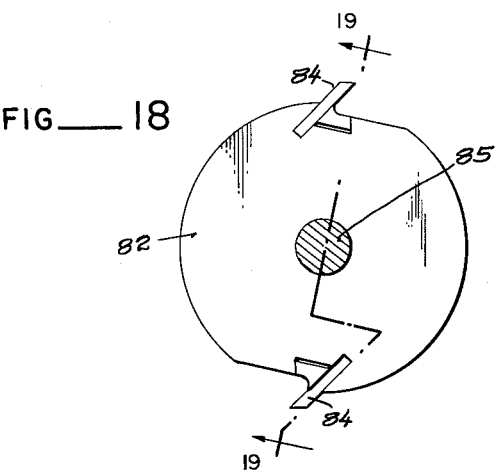
FIG.__18
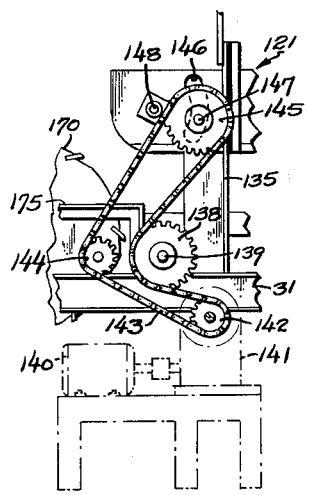
FIG.__20
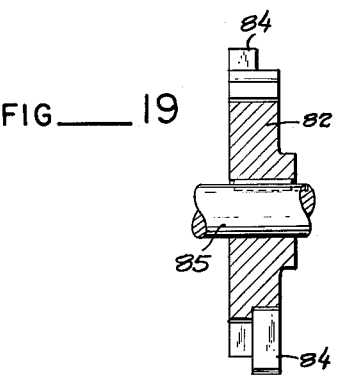
FIG.__19
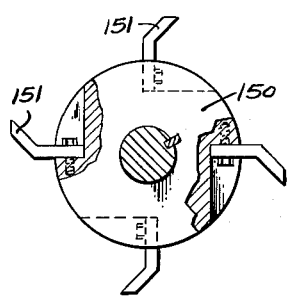
FIG.__21
*INVENTOR.*
ERNEST E. RUNNION July 5, 1966 E. E. RUNNION 3,259,157
PRODUCTION OF DIMENSIONAL LUMBER FROM SMALL-DIAMETER LOGS
Original Filed July 13, 1962 14 Sheets-Sheet 10
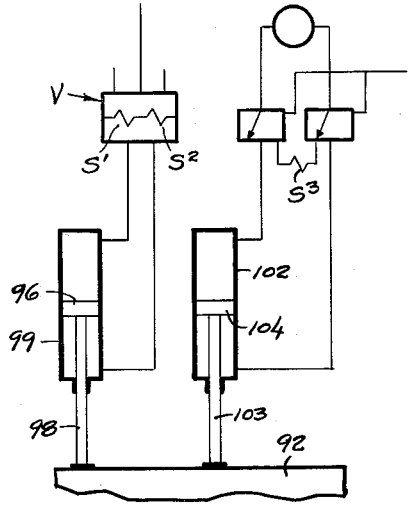
FIG__24
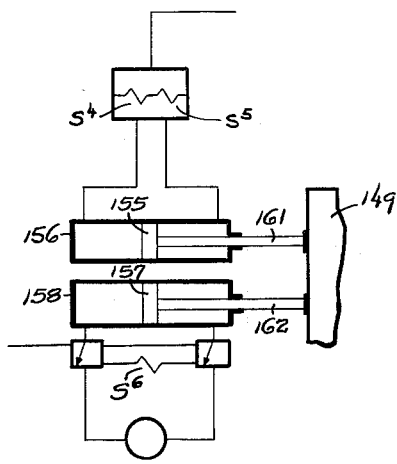
FIG__25
INVENTOR.
ERNEST E. RUNNION July 5, 1966   E. E. RUNNION   3,259,157
PRODUCTION OF DIMENSIONAL LUMBER FROM SMALL-DIAMETER LOGS
Original Filed July 13, 1962   14 Sheets-Sheet 11

TABLE LEVEL FOR EVEN SIZE LOGS
TABLE LEVEL FOR ODD SIZE LOGS

INVENTOR.
ERNEST E. RUNNION

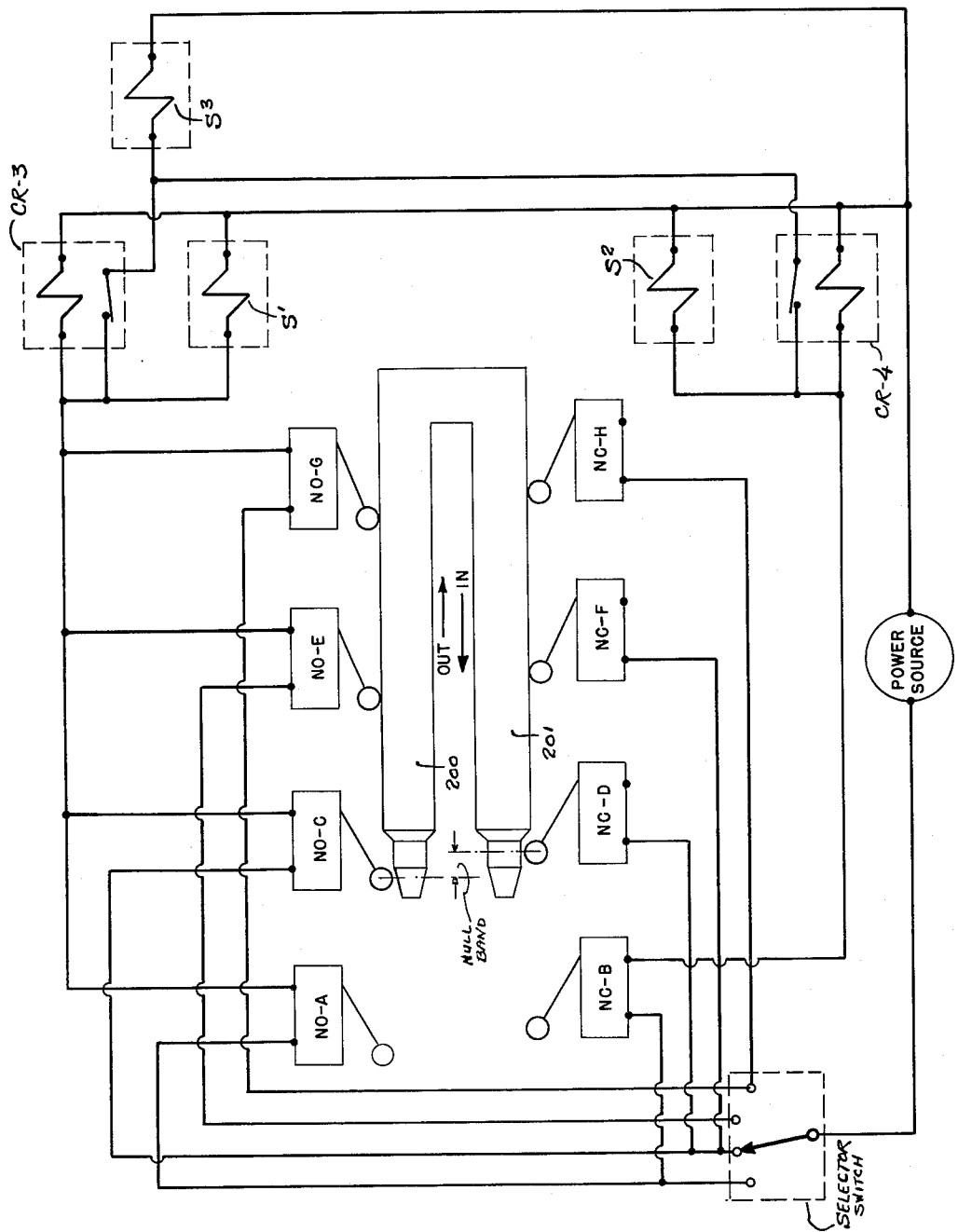

July 5, 1966 E. E. RUNNION 3,259,157
PRODUCTION OF DIMENSIONAL LUMBER FROM SMALL-DIAMETER LOGS
Original Filed July 13, 1962 14 Sheets-Sheet 13
FIG_ 29
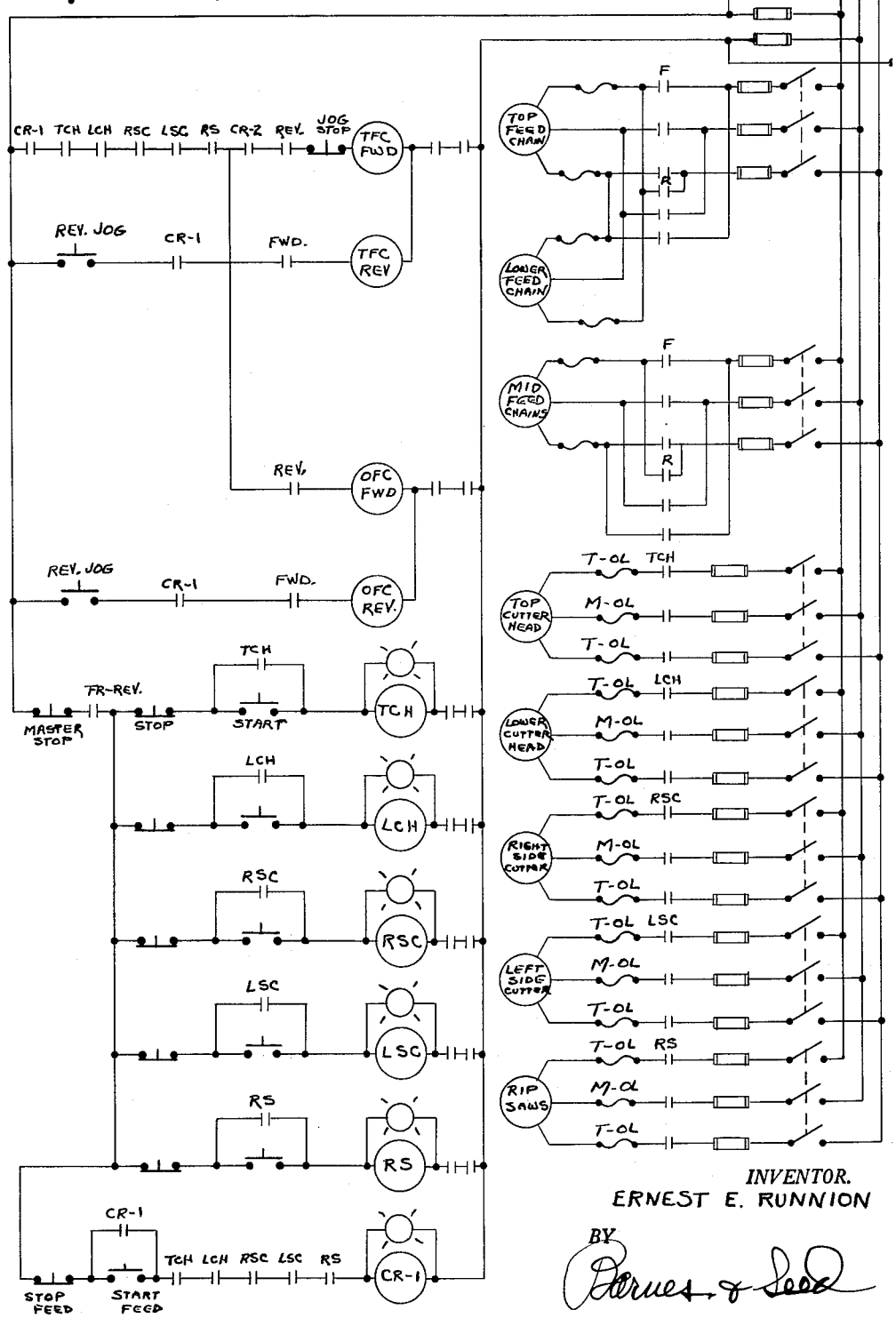
INVENTOR.
ERNEST E. RUNNION

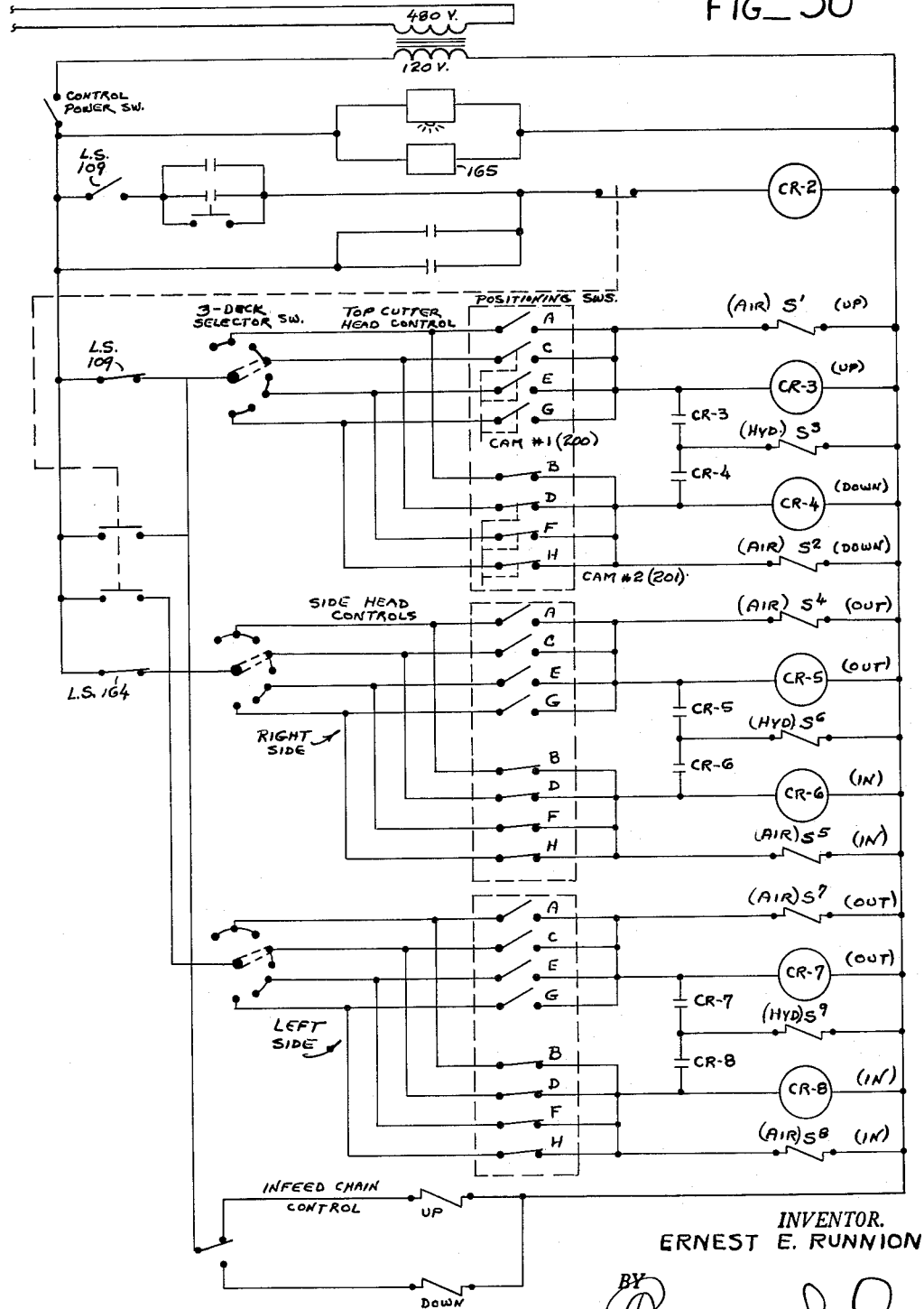
FIG_30

United States Patent Office 3,259,157
Patented July 5, 1966

3,259,157
PRODUCTION OF DIMENSIONAL LUMBER FROM
SMALL-DIAMETER LOGS
Ernest E. Runnion, 828 Cota St., Shelton, Wash.
Continuation of application Ser. No. 209,549, July 13,
1962. This application Apr. 23, 1965, Ser. No. 453,547
20 Claims. (Cl. 144—312)

This invention is a continuation of my prior application for Letters Patent of the United States, filed July 13, 1962, Ser. No. 209,549, now abandoned, which was in turn a continuation-in-part of application filed May 12, 1961, Ser. No. 109,625, now abandoned. The invention pertains to log-cutting mills, and for is general object aims to provide a new and improved means and method for producing dimensional lumber from debarked logs of small diameter.

More particularly, it is one object of the invention to provide a log-cutting mill especially designed to handle logs of a diameter, say 12" and under, which cannot be efficiently handled by log-cutting mills of existing conventional design.

It is a further important object to provide a mill which can be operated unattended, requiring little or no attention from an operator other than to start and stop the mill at the initiation and end of a run period.

As a yet further important object the invention purposes to provide a mill which employs cutter heads to reduce the log to a shape which, at the tail end of the machine, need only be run through gang saws to obtain the end product of dimensional lumber, the cutter heads producing high quality chips from portions of the log which in the usual sawmill issue as slab-wood and generally are burned together with sawdust as waste.

These and still more particular objects and advantages of the invention will appear and be understood in the course of the following description and claims, the invention consisting in the new log-cutting process and in the novel construction, adaptation and combination of the parts of a machine for practicing such process, hereinafter described and claimed.

In the accompanying drawings:

FIGURE 1 is a side elevational view illustrating a log-cutting mill constructed to embody the preferred teachings of the present invention, and in conjunction therewith indicating a debarked log in position preparatory to entering the infeed end of the mill and dimensional lumber leaving the outfeed end of the mill.

FIG. 2 is a fragmentary side elevational view of the infeed portion of the mill enlarged from the scale of FIG. 1.

FIG. 3 is a similarly enlarged fragmentary side elevational view of the log-cutting and outfeed portions of the mill.

FIG. 4 is a top plan view of the fragmentary portion of the mill shown in FIG. 3.

FIGS. 8, 9, 10 and 11 are fragmentary transverse vertical sectional views drawn to an enlarged scale on the lines 8—8, 9—9, 10—10 and 11—11, respectively, of FIG. 3, and in each instance showing in phantom the log being processed.

Figure 5:
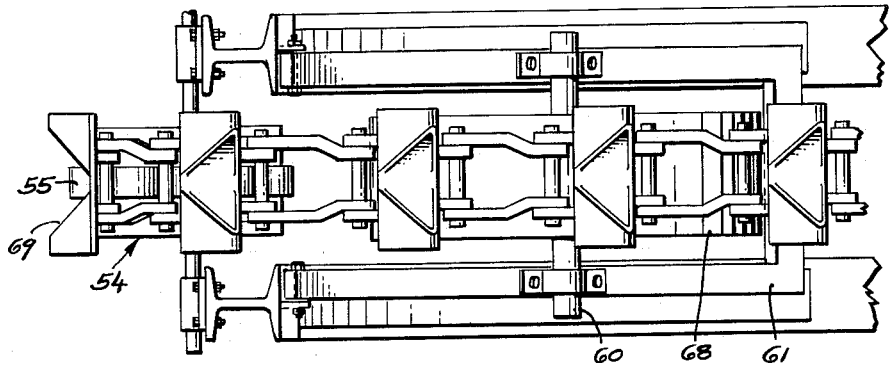
FIG. 5 is a fragmentary top plan view of the portion of the machine shown by the vantage arrows 5—5 of FIG. 2.
Figure 6:
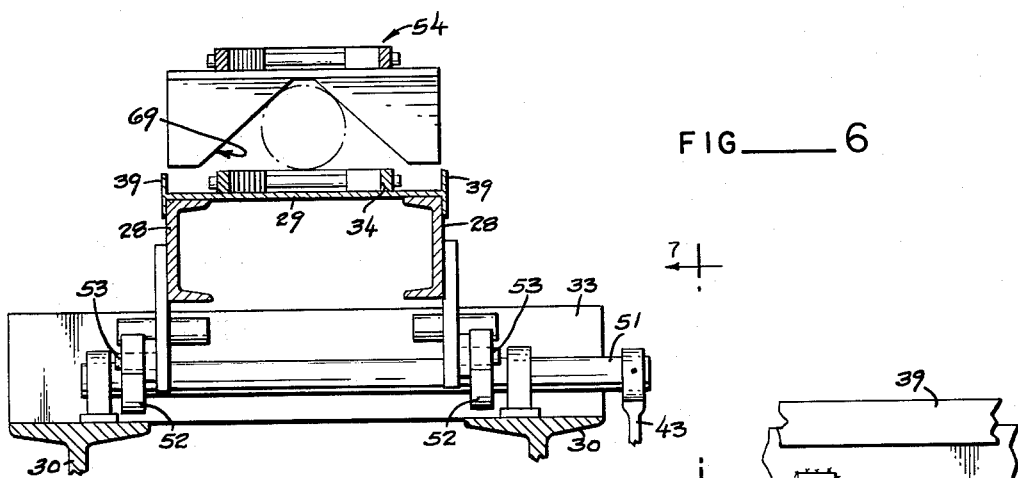
FIG. 6 is a fragmentary transverse vertical sectional view drawn to an enlarged scale on line 6—6 of FIG. 2.
Figure 7:
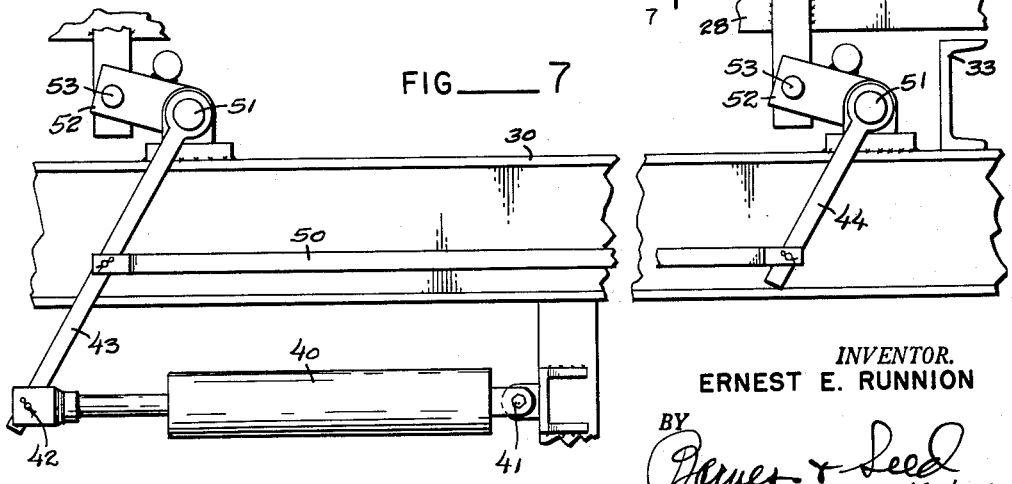
FIG. 7 is a fragmentary side elevation viewed from the vantage point indicated by 7—7 in FIG. 6.
Figure 12:
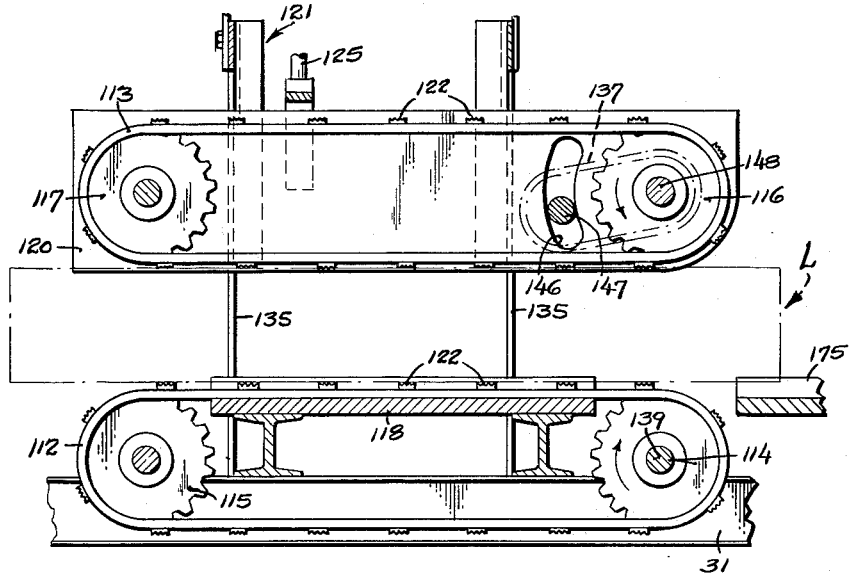

FIG. 12 is a fragmentary longitudinal vertical sectional view on line 12—12 of FIG. 10, and also incorporating a phantom illustration of the log.

Figure 13:
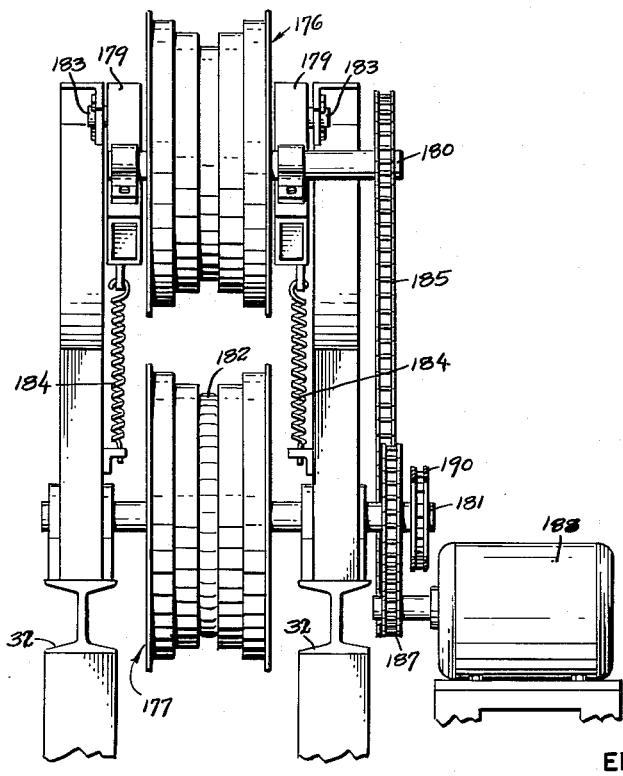

FIG. 13 is a fragmentary transverse vertical sectional view drawn to the same scale as FIGS. 7 through 12, inclusive, on line 13—13 of FIG. 3.

Figure 14:
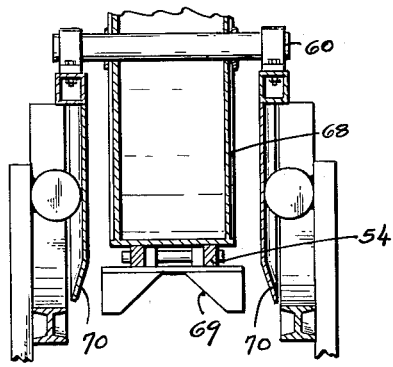

FIG. 14 is a fragmentary transverse vertical sectional view on line 14—14 of FIG. 2.

Figure 15:
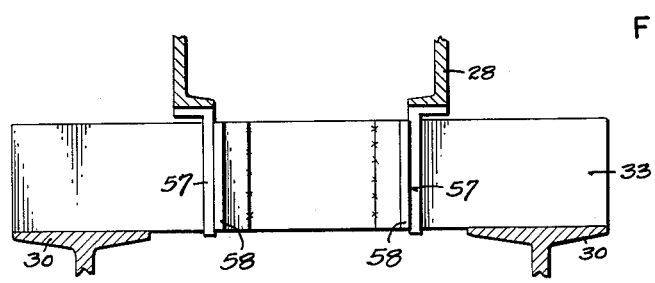

FIG. 15 is a transverse vertical sectional view drawn to a yet larger scale on line 15—15 of FIG. 2.

Figure 16:
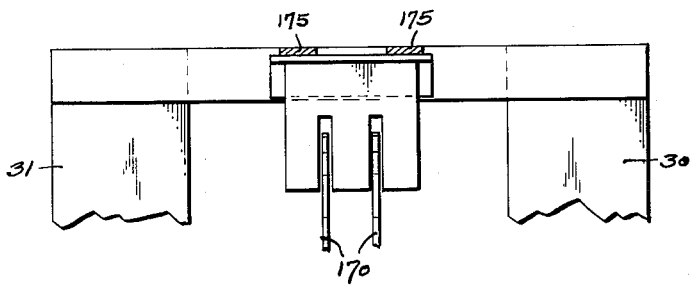

FIG. 16 is a fragmentary horizontal sectional view drawn to an enlarged scale on line 16—16 of FIG. 3.

FIG. 17 is an enlarged-scale fragmentary top plan view detailing portions of the machine shown at the extreme left end of FIG. 4.

FIG. 18 is an enlarged scale vertical sectional view detailing one of the cutter heads which the machine employs.

FIG. 19 is a fragmentary vertical sectional view on line 19—19 of FIG. 18.

FIG. 20 is a fragmentary side elevation employing the same scale but viewed from the side opposite that of FIG. 3, to detail the drive for the second of three conveyors provided in the machine.

FIG. 21 is an enlarged-scale vertical sectional view detailing another of the cutter heads which the machine employs.

FIG. 22 (Sheet 3) is a fragmentary elevational view of the cutter head shown in FIG. 21.

FIG. 23 (Sheet 2) is an enlarged-scale fragmentary elevational view detailing one of the work-gripping flights presented by said second conveyor.

FIGS. 24 and 25 (Sheet 10) are schematic views showing the fluid systems which position and hold the cutter heads.

Figure 26:
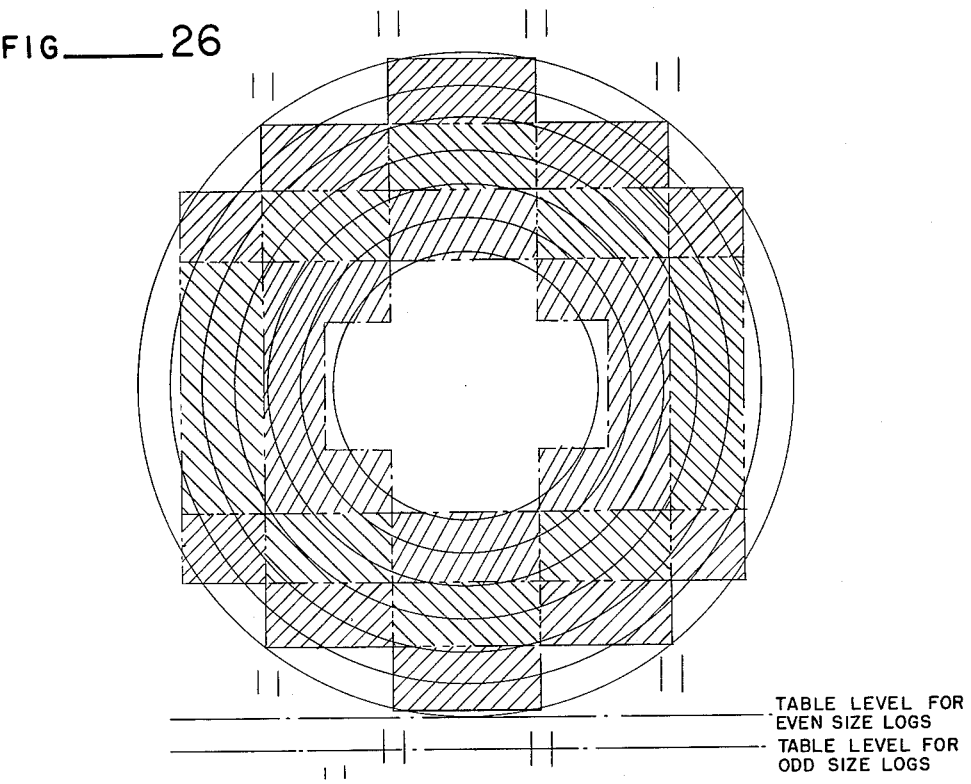
Figure 27:
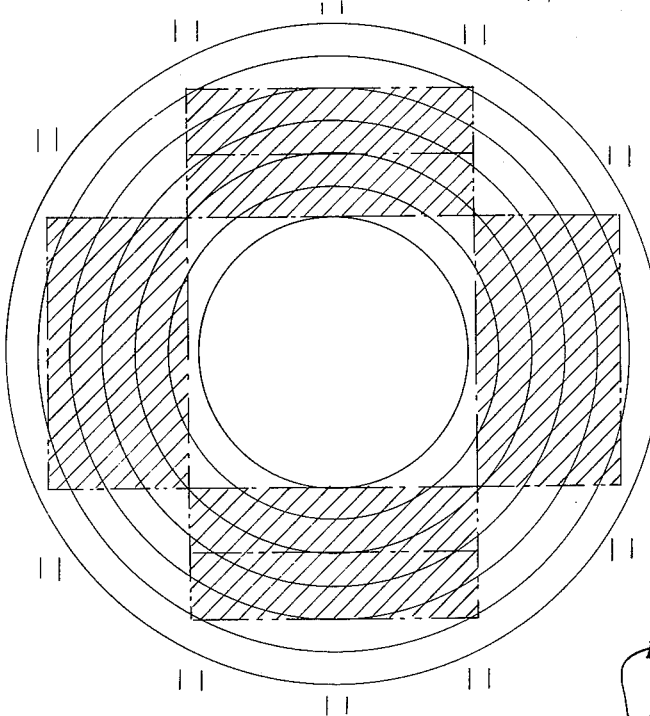

FIGS. 26 and 27 are diagrammatic views presenting a comparative illustration of the manner in which logs of different diameters are first reduced by the cutter head of the present invention to a stepped profile configuration and are then cut by gang saws into dimensional lumber.

FIG. 28 is a schematic illustration of the cam mechanism of one of the power positioners which the machine employs to move the movable cutter heads, and including a wiring diagram of a portion of a related electric circuit;

FIGS. 29 and 30, taken together, are an electric diagram showing the machine's complete circuitry.

Tracing the processing steps to which a log, having been first debarked, is subjected, a series of three independent driven conveyors, each comprised of an upper and a lower complement, are responsible for carrying the log through the machine. The lower complement of the first of these conveyors is enabled to occupy either of two levels, selectively, and receives the debarked log and moves the same first through a reading station and then through the first of two chipping stations. Provided at this station are an upper and a lower cutter head. Carried by these cutter heads are chipper knives so placed in a staggered pattern that the log, traversing the heads, is reduced to a configuration which in end profile presents at each side above the approximate horizontal center of the log ascending planar steps of which the steps at one side are co-planar with those at the other side, and presents at each side below the approximate horizontal center of the log descending planar steps whic hconstitute mirror counterparts of the ascending steps. The transverse horizontal centers about which said cutter heads turn is stationary in respect of the lower head and adjustable vertically in respect of the upper head. The reading station has as its function to "sense" the diameter of the log which is being conveyed to the chipping stations. From this reading, mechanism is put into operation which positions the conveyor at a predetermined one of its two levels and positions the upper said cutter head at a predetermined one of several locations spaced apart at 1" increments. The reading additionally functions to position a second set of cutter heads which occupy the second of the aforementioned two chipper stations and act to trim the opposite sides of the conveyed log.

The second conveyor engages the log immediately following initiation of the first cutter heads' chipping action and continues to hold the log as the latter traverses the cutter heads of the second chipper station. Such second conveyor accommodates its upper complement to vertical adjustment while holding the lower complement on a stationary level.

Proceeding beyond the second said chipper station, and namely the station occupied by the side trimmer heads, the conveyed log traverses gang circular saws occupying a sawing station. These saws divide the chipper-reduced log into dimensional lumber by sawing the log longitudinally on the parallel planes of the riser faces.

The third conveyor handles the dimensional lumber as it issues from the sawing station. Level considered, such third conveyor, like the second conveyor, has its upper complement movable and its lower complement stationary. The third conveyor carries the dimensional lumber from the tail end of the machine. For purposes of the present description, the three said conveyors are termed "infeed," "mid-feed," and "outfeed."

Proceeding now to describe in detail the illustrated embodiment of the invention, there is provided a suitable machine frame. Included in the frame are two strings of channel principals 30, 31 and 32 extending in parallel spaced relation at opposite sides of the machine's longitudinal median line. Vertical posts give support to said principals, and cross members extend between the principals at suitably spaced intervals of the length. Such cross members include a plurality of ties 33 surmounting the channel principals 30 and forming a low-level rest for beams 28 which underlie a horizontal table 29. Keeper flanges 39 extend along each of the opposite sides of the table.

Riding on the table is the upper run of an endless chain 34 constituting the lower complement of the aforementioned infeed conveyor. This chain is trained about live and idler sprocket wheels 35 and 36, respectively. An electric motor 37 drives the sprocket wheel 35. Weighted swing-mounted rollers 38 are provided to take up slack in the chain.

Table 29 admits of being located either at the low level prescribed by said ties or at an upper level raised a distance of 1" therefrom. A hydraulic ram comprised of a double-acting piston working in a cylinder 40 moves the table between these levels. The cylinder is pivoted at 41 to the frame, and the rod of the piston in attached by pin 42 (FIG. 7) to the free end of one of two lever arms 43 and 44 connected for parallel motion by a bar 50. Each lever arm has its root end fixed to one end of a respective shaft 51 journal-mounted from the machine frame for rocking motion about a transverse horizontal axis, and also fixed to these shafts and with the levers 43–44 producing substantial bell-cranks are pairs of lever arms 52 pivotally attached by their free ends, as at 53, to the four corners of the table. Detailed in FIG. 15, a respective guide leg 57 is also provided at each of the four corners of the table. These legs depend from the beams 28 and receive a slide journal from frame-carried ribs 58 to hold the table against lateral displacement.

A second live endless chain 54 constitutes the upper complement of the infeed conveyor. The purpose of such upper complement is to impose upon the conveyed log a restraint precluding the log from being "snaked" forwardly off the conveyor at a travel speed greater than is prescribed by the conveyor. The influence which would cause this accelerated travel, in the absence of the imposed restraint, is the "climber" cutting action of the cutter heads which the log encounters in traversing the above-mentioned first chipping station. The chain 54 is trained about front and rear sprocket wheels 55 so as to present upper and lower runs of which the lower run, or more properly dog-flights 56 thereon, bears upon the conveyed log and performs the chain's hold-back function. An electric motor 67 drives the "hold-back" chain to produce a travelling speed the same as that of the conveyor chain 34 (50 f.p.m. by preference). Weighted rollers 68 journaled by trunnions 60 from the free ends of swingably mounted yokes 61 load the lower run of the hold-back chain with a downward thrust sufficient to press the dogs 56 firmly against the conveyed log. The back faces of these dogs lie perpendicular, or approximately perpendicular, to the plane occupiled by the chain, and the front faces are sloped toward said plane, the purpose being to assure an easy withdrawal of the dogs from the log as the chain recedes from the log at the delivery end of the machine's infeed section. Viewed in front elevation, the dogs present in a reentrant V-shaped pocket 69 into which the log is received and which acts to center the log relative to the table.

At or about the mid-length of the hold-back chain 54 there is provided a roller 62 swingably mounted by an arm 63 to ride upon the upper face of said chain's lower run. Arm 63 acts through a jointed connection 64 to actuate a 3-deck selector switch housed in a box 65. The selector switch activates relays, through positioning switches, to locate both the table 29 at the determined one of its permitted two levels (see FIG. 26) and the movably mounted cutter heads. There is one such movable head at the first chipping station and there are two such movable heads at the second chipping station. To reiterate, the adjustments given to the cutter heads reflect 1" increments in the diameter of the log being read. The level to which the table 29 is adjusted (this being for maximum recovery of dimensional lumber) depends upon whether the log's diameter is an odd or an even number of inches, odd-number diameters being set at the lower level and even-number diameters being set at the upper level.

It is important that the hold-back chain be driven from its rear rather than its front end, experiments having established that when the chain's lower run is pulled down there is a marked tendency for such lower run to be lifted. I have found it desirable to provide cheek plates 70 upon each side of each of the weighted rollers 68, these cheek plates complementing the sprocket wheels 55 to keep the lower run of the chain against lateral displacement.

The first chipping station is reached by the leading end of the conveyed log momentarily after such end issues from the tail end of the described infeed conveyor. The advancing log first traverses the lower and then the upper of the two revolving chippers which are provided at this station. The lower chipper is denoted generally by 80 and the upper chipper by 81 (FIGS. 1 and 3). An odd-numbered set of mounting discs 82 carried side-by-side upon a common live mandrel compose each of said chippers, and in the preferred embodiment (FIGS. 18 and 19) two staggered moderately overlapping bitts 84 placed diametrically opposite one another and collectively encompassing the width of the concerned disc are fitted to each said disc. This width is preferably 2". Cutter head components of 4" width can be satisfactorily employed but the output of lumber is somewhat reduced. Having progressively increasing diameters from the center disc outwardly in both lateral directions, the progression being in increments of 1", the sets of cutter head discs present a stepped profile configuration when viewed from a vantage point normal to the rotary axis of the mandrel.

The mandrel 85 for the bottom chipper head 80 is journaled by its ends in frame-carried bearings 86 for rotation about a fixed axis, and is belt-driven at a speed of, say 1200 r.p.m. from an electric motor 87 to turn in a clockwise direction as viewed from the vantage point of FIGS. 1 and 3.

The mandrel 90 for the upper chipper head 81 is journaled by its ends in bearings 91 rigidly secured to a carriage 92 receiving a journal from the frame for vertical slide motion. The slide journal is provided by groove-forming slippers 93 fitting outwardly directed vertical tongues which are made a part of the frame. Belts drive the mandrel 90 from an electric motor 95 carried by the carriage, giving to the chipper head a counter-clockwise rotation as viewed from the vantage point of FIGS. 1 and 3. The vertical motion of the carriage, in increments of 2" governed by messages received by a power positioner, is obtained by pressure air operating upon a double-acting piston 96 (FIG. 24). The piston works in a vertically disposed cylinder 99 (FIGS. 8 and 24) footing upon a horizontal frame member 97, and a rod 98 from the piston connects at its upper end to the head end of the carriage. A preferred system for shifting the piston 96 in said air cylinder 99 is the "Hanna-Powr" positioner produced by Hanna Engineering Works, Chicago, Illinois. Employed in conjunction with vertical cam rod means 100 (FIG. 8) movable in concert with the carriage, the system provides pairs of limit switches associated with a 3-position valve V (FIG. 24) governing the delivery of air from a pressure source and operated in opposite directions from a centered neutral position by two solenoids $S^1$ and $S^2$. One of the limit switches of each pair is closed and the other open and are placed within a frame-carried box 101 on opposite sides of the travel path of the cam rod means, the several sets (one for each setting of the chipper) being located at separated intervals along such travel path. Multiple sets of the limit switches admit of being compacted into an unusually short compass. A hydraulic cylinder 102 is mounted alongside the air cylinder 99 as a locking complement therefor, similarly footing upon the frame member 97 and connecting with the carriage by the rod 103 of its double-acting piston 104. Performing its holding function by establishing a hydraulic lock, the arrangement is one providing a normally open fluid-flow connection between the two ends of the cylinder closed upon the excitation of a solenoid $S^3$ which is included in a normally open electric circuit caused to be closed in concert with an excitation of either of the solenoids $S^1$ or $S^2$.

To the immediate rear of each of the described chippers there is provided a respective guide shoe, as 105 and 106 (FIG. 3), each formed to present stepped surfaces disposed to bear upon the horizontal flats which the lower and upper chippers have produced in the advancing log. To the immediate rear of these shoes there are provided respective pick-up funnels 107 and 108 acting to collect pulp chips delivered from the chippers and re-direct the same to one side of the machine. A framework common to the guide shoe 106 and the funnel 108 is hinged to the carriage 92 so as to swing in a rearward and upward direction about a pin 110. A heavily loaded spring 111 yieldingly resists this swing motion. The purpose of the swing mounting is to relieve binding.

Upon leaving the first chipper station the leading end of the advancing log enters the second chipping station, hereinafter referred to as the trimming station, and has its side edges subjected to the trimming action well before the trailing end of the log has cleared the chippers 80 and 81. Somewhat in advance of its engagement with the trimmers the log is brought between the lower and upper complements of the mid-feed conveyor. The two said complements are each comprised of a respective endless chain, as 112 and 113 (FIGS. 3, 4, 10, 12 and 23), trained in the instance of the bottom chain about live and idler sprocket wheels 114 and 115 and in the instance of the top chain about live and idler sprocket wheels 116 and 117. A slide-way for the upper run of the lower chain 112 is provided by the groove of a frame-carried channel member 118. Side flanges of this groove act to engage the bottom rib which was produced on the log by the profiling, so as to guide the log with positive restraint against lateral displacement. As can be seen in FIG. 3 the guide function of such channel member 118 takes over immediately behind the guide shoe 105. A complementing guide office is performed upon the upper rib of the advancing log by cheek plates 120 (see FIGS. 9 and 10) of a vertically movable carriage 121 which gives support to the upper chain 113. Both chains are provided at spaced intervals of their length with log-gripping flight-lugs 122.

The carriage 121 has slippers fixed thereto. These slippers guide the carriage in vertical motion by engaging rigid standards 135 rising from the channel principals of the main frame. The carriage is lifted, so that its chain will ride upon the advancing log, by direct engagement of the log with the chain. When so lifted the carriage is brought into contact with the gravity-opened switch arm 123 (FIG. 9) for a limit switch 124. The responsive closing of this switch subjects the piston of an overhead cylinder 136 to pressure from the source of pressure air supply, the piston imposing hold-down pressure upon the carriage through piston rod 125.

A single electric motor 140 drives the two live sprockets 114 and 116, passing its drive through a gear box 141 to a sprocket wheel 142 (FIG. 20). A drive chain 143 is trained about this sprocket wheel, an idler sprocket 144, a sprocket wheel 138 on the shaft 139 which carries the live sprocket 114, and a sprocket 145 which is guidably mounted for vertical motion in an arcuate slot 146 developed, for its center, about the axis of rotation of a live shaft 148 which carries the sprocket wheel 116. A spring (not shown) yieldingly urges sprocket wheel 145, or which is to say the live shaft 147 by which it is carried, upwardly in the slot. Sprocket wheels of a corresponding small diameter are fixed one to the shaft 147 and the other to the shaft 148 to accommodate a transfer chain 187.

The log, now moving with the mid-feed conveyor through the trimming station at the same speed previously given by the infeed conveyor, has its side edges trimmed by the side trimmers. Best seen from an inspection of FIGS. 21 and 22, each said trimmer comprises a cutter head 150 of a length exceeding the diameter fo the largest log which the machine will handle. Bitts 151 are placed at lapping staggered intervals around the perimeter of the head to collectivly encompass the length of the head. Each said cutter head, one at one side and the other at the other side of the machine, is carried by a respective swing-frame 149 for horizontal inward and outward motion about the center of a king pin 152 as an axis. Each swing-frame has an electric motor 153 thereon for driving the related cutter head in the direction of travel of the log, and also carries a funnel 154 through which chips thrown forwardly from the cutter head are directed laterally from the machine. The positioning and locking of the swing-frames is accomplished in the same manner as the carriage 92 by double-acting pistons 155 working in air cylinders 156, and each said positioner piston is complemented by a double-acting piston 157 working in a hydraulic cylinder 158 lying alongside the air cylinder to similarly provide a hydraulic lock. The two said cylinders 156 and 158 are disposed horizontally in positions transverse to the frame and take their purchase upon outriggers 160 of the main frame. The piston rods 161 and 162 of the pistons are pivotally attached to the concerned swingframe. A power positions governed, like the positioner provided for each of the side trimmers. The cam therefor is designated by 126 and the box housing the related limit switches by 127.

Illustrated in FIGS. 3 and 9, two limit switches 109 and 164 are positioned in the path travelled by the advancing log, the former lying immediately, behind the chipper station occupied by the chippers 80 and 81, and the latter lying immediately behind the trimming station occupied by the two trimming heads 150. An electric eye 165 is also provided to receive a light beam projected across the travel path of the log immediately before the latter reaches said first chipper station. The limit switch 109 has two functions. If a following log reaches the position occupied by the electric eye before a preceding log has cleared such limit switch the eye acts through a relay to stop the infeed conveyor until the log has passed the limit switch. The limit switch, when depressed by an advancing log, also holds the circuit open to the selector switch so that the next log can be preselected, no signal being permitted to pass to the relay which is related to the power positioner for the chipper 81 until the limit switch is released. Limit switch 164 acts for the side trimmers in the same manner as limit switch 109 acts for the head chipper 81.

The gang circular saws of the machine's sawing station are designated by 170. In order to cut a log of the maximum diameter for which the illustrated machine is designed four saws are provided spaced 2″ apart in correspondence with the transverse spacing between the riser planes of the chipper-processed log. The four saws are shown as being mounted on two longitudinally spaced arbors 171 and 172 each of which is journaled from the frame and direct-driven by a respective electric motor 173 and 174. In its traversal of the sawing station the log rides on stepped guide-ways 175 (see FIG. 11). The side walls which flank the lowermost flat of these guideways constitute substantial prolongations of the flanking side walls of the guide 113 so that the log, commencing with the initial profiling action imposed by the cutter head 80, is constrained against lateral deflection throughout the course of its conveyed travel to and through the saws. The upper guide walls 120 complement the lower guide as the log is traversing the side trimmers and passing through the saws.

The dimensional lumber which is the product of the sawing station is engaged by the outfeed conveyor immediately following issue from such sawing station. Both the upper and the lower complement 176 and 177, respectively, of this conveyor present a profile configuration (FIG. 13) corresponding to that of the collected bundle of issuing dimensional lumber, and are comprised in each instance of a plurality of discs secured upon a common live spindle 180 and 181. The lower complement's central disc has a knurled perimeter for establishing a grip upon the advancing lumber. Each of the remaining discs are smooth-faced, permitting slippage in compensation of the differing rim speeds. Spindle 181 rotates about a fixed axis. Spindle 180 is carried by arms 179 for vertical swing motion about the center of pins 183 as an axis, and is urged downwardly by springs 184. A chain 185 (FIGS. 4 and 13) suitably tensioned by a floating idler (not shown) drives the spindle 180 from an electric motor 186 (FIG. 4), and a chain 187 drives the spindle 181 from an electric motor 188. A chain takeoff 190 also carries the drive from the motor 188 to an end conveyor 191.

Tracing the sequence of operation, reference is had to FIG. 28 in its schematic representation of a "power positioner" circuit, and to the wiring diagram of FIGS. 29 and 30. In order to start the machine it is required that all four cutter heads and the saws be started before the conveyors will run. Manual switches are provided for this purpose. The feed chain holding relay CR-1 (FIG. 29) is started through normally open contact in TCH-LCH-RSC-LSC-RS contactors. Such relay starts the top and bottom infeed chains through the normally closed contact of the magnetic instantaneous trip relays M-OL. The infeed and mid-feed chains have a jog reverse on each. If the mid-feed chain is reversed its normally closed contact automatically stops all cutters by opening the circuit. The 3-deck selector switch housed in box 65 (FIG. 2) is common to all of the movable cutter heads and activates the relays (see FIG. 30) through its three sets of 8-position switches to move said cutters to the correct one of four cutter positions. As can be seen in FIG. 30, the relative movement given to the side cutters corresponds to that of the top cutter in only five of the selector switches' eight positions, and this reflects the fact that the table 29 is raised or lowered 1″, according as whether the diameter of the log is an even or an odd number of inches, in order to produce the maximum amount of lumber.

With the related deck of the selector switch the circuit for each power positioner includes eight limit switches—A through H—two relays, two air solenoids, and one hydraulic solenoid. The cam rods of the concerned power positions each present two spears 200 and 201, see FIG. 28, acting upon the limit switches. The sets of limit switches are arranged in two banks of four switches each, with those of one bank being normally open and those of the other bank normally closed. The two cam-rod spears, by occupying positions in narrow "null point bands," open the circuits to both of the air solenoids, as $S^1$ and $S^2$. When the relays, as CR-3 or CR-4, are energized in consequence of the spears moving out of the null point bands, the normally closed hydraulic solenoid, as $S^3$, becomes energized and responsively unlocks the hydraulic piston.

The top cutter head is controlled by CR-3 and CR-4, the right side head by CR-5 and CR-6, and the left side head by CR-7 and CR-8.

If no log is in the cutting area of the machine the cutter heads move to position when the selector switch is turned. As the log passes through the machine it actuates limit switch 109 immediately after progressing beyond the top and bottom cutters and holds the same depressed while the log is being cut. If another log follows while such limit switch is still depressed the photoelectric eye 165 (FIG. 30) energizes CR-2 which stops the feed chain. LS-109 also holds the circuit open to the selector switch so the next log can be preselected, nothing occurring until the first log is out of the first cutters and releases LS-109. When LS-109 returns to normal position relay CR-3 or CR-4 is energized. Assuming it is CR-3, CR-3 will open air valve solenoid S and through its normally open contact will open hydraulic valve solenoid $S^3$. CR-3 also keeps CR-2 energized so the feed chain will not bring in another log to the cutters until the cutters have been moved, if a move is called for. When the positioning switches cancel out CR-3, CR-2 drops out, again closing the circuit to the feed chain 34 and 54. LS-164, located immediately behind the side cutters, prevents the latter from moving until the log being cut is finished and LS-164 is released.

A toggle switch on the infeed chain control moves the infeed table 29 up or down. A jog button bypasses the limit switches LS-109 and LS-164 so the cutters can be moved manually at any time.

M-OL (FIG. 29) is a magnetic overload trip in the line to each cutter and saw motor. If any motor reaches more than 150% load the normally closed contact of this trip opens the circuit to the infeed chains, stopping same until the load returns to normal. The trips jog the feed automatically if one or more cutters of the saw motors are subjected to an above-normal load.

I stress that each of the cutter heads 80, 81 and 150 produces a "pulp" chip in that the head is a climber-cut head, a term which means that the bitts of the cutter head, in the performance of their cutting action, are rotating in the same direction in which the conveyed log is moving. If moving in the opposite direction a hogging action results. Cutter heads making a hogging cut upon a log tear the wood.

It is believed that the invention will have been clearly understood from the foregoing detailed description of my now-preferred illustrated embodiment. Changes in the details of construction may be resorted to without departing from the spirit of the invention and it is accordingly my intention that no limitations be implied and that the hereto annexed claims be given the broadest interpretation to which the employed language fairly admits.

What I claim is:

1. The method of cutting a log which comprises conveying the log along an established linear travel path through a succession of localized in-line cutting station, and as the log traverses said stations in course of said conveyed travel first progressively profiling the log so as to produce, at each of the opposite sides of a vertical diameter of the log, pyramided steps ascending above and descending below the horizontal diameter of the log with the riser faces of said ascending steps lying parallel to one another and being co-planar with the riser faces of the descending steps, and then producing dimensional lumber from the profiled log by sawing the same longitudinally on the planes of said riser faces, at least a respective one of the riser faces which said profiling provides located below the horizontal diameter of the log at each of the opposite sides of said vertical diameter together with the run component of a downwardly facing step which meets said respective riser face being employed as guide surfaces to hold the log against lateral displacement throughout substantially the entire period of the log's following conveyed travel commencing as soon as each said concerned riser face and run component of the step takes shape upon the leading end of the log.

2. In a log-cutting machine, means for conveying a log along an established travel path, cutter heads acting upon the log in course of its conveyed travel for profiling the same at each side of the log's vertical diameter into a progressively developing cant faced about the entire perimeter by flats which lie at right angles to one another, and saws acting upon the cant in course of its conveyed travel for sawing the cant longitudinally along planes which lie parallel to one of the flats and by said sawing dividing the cant into dimensional lumber, said cutter heads being driven in a direction giving a climber cut producing chips with a uniform-length grain suitable for the digesting process of a high-grade pulping operation, at least one of the cutter heads being mounted for shifting movement inwardly and outwardly relative to the travel path of the log as an accommodation to logs of different diameter, a controlled piston-cylinder assembly being provided which is powered by pressure air and operatively connected with said shiftable cutter head for rapidly shifting the head into a selected one of the several settings of a table of settings spaced one from another predetermined distances, a means independent of the piston-cylinder assembly being provided for releasably setting the shiftable cutter head in said selected positions into which the same is shifted.

3. A log-cutting machine according to claim 2, said profiling producing parallel-sided ribs at the top and at the bottom of the log centered in relation to the width of the log, guides being provided which bear against opposite sides of said produced ribs holding the conveyed log against laternal displacement throughout substantially the entire following period of the log's conveyed travel.

4. In a log-cutting machine, a plurality of cutting stations, conveyors operating to feed logs through said several cutting stations successively, an upper and a lower cutter head so formed and positioned at said first station that when a conveyed log traverses said first station the upper cutter head profiles the two quarter-circle sectoral portions of the conveyed log lying above a transverse horizontal center line into ascending pyramided steps and the lower cutter head profiles the two quarter-circle sectoral portions of the log lying below said horizontal center line into descending pyramided steps, the riser faces which lie between the run components of the steps occupying paralleling vertical planes, and saws positioned at a following cutting station and acting upon a profiled log, as the latter traverses said following cutting station, to produce dimensional lumber by slicing the conveyed log along the several vertical planes of said riser faces, said profiling producing at the bottom of the log a parallel-sided rib centered in relation to the width of the log, guides being provided which take a bearing engagement against opposite sides of said rib immediately following the initial forming thereof and thereafter maintain said engagement, so as to hold the conveyed log against lateral displacement, until the log has traversed the saws.

5. The log-cutting machine of claim 4 in which said profiling also produces a centered parallel-sided rib at the top of the log, and having guides which take a bearing engagement against said top rib as the log is being conveyed.

6. The log-cutting machine of claim 4 having means made to operate automatically when one conveyed log is in the process of traversing said first station and as the leading end of a following log being conveyed reaches a predetermined point spaced a moderate distance to the front of the first cutting station for holding said following log in an arrested condition until said preceding log has cleared the first cutting station.

7. The log-cutting machine of claim 4 in which said conveyors include an outfeed conveyor receiving the multi-board packs of dimensional lumber as the same issue from the sawing station and comprised of a pair of complementing driven guide wheels rotating about vertically spaced transverse horizontal axes and each correspondingly stepped in both lateral directions from center so that, in end profile, the opening between the wheels matches the end profile of the multi-board packs of lumber.

8. A log-cutting machine according to claim 6 in which at least one of said stepped guide wheels has the surface of a single one of its several rims roughened so as to establish a frictional grip upon the edge of a conveyed board, and having its other rims smooth-faced.

9. The log-cutting machine of claim 4 in which the cutter heads are driven in a direction giving a climber cut so as to produce chips in which the grain is of uniform length and thus are suitable for the digesting process of a high-grade pulping operation, the conveyors which convey the logs through said first cutting station comprising an upper and a lower complement both of which are driven, means being provided yieldingly pressing each conveyor's upper complement directively toward the lower complement to establish a purchase upon the conveyed log resisting a travel influence reflecting the climber action of the cutter heads.

10. In a log-cutting machine, means for conveying a log along an established travel path, upper and lower cutter heads acting upon the log in course of its conveyed travel for profiling the same at each side of the log's vertical diameter into steps ascending above and descending below the log's horizontal diameter, said steps producing riser faces which occupy planes paralleling the plane in which said vertical diameter lies, and saws acting upon the profiled log in course of said conveyed travel positioned so as to cut the same on the vertical planes of the riser faces for producing dimensional lumber, the lower cutting head rotating about a fixed axis while the upper cutter head is shiftable into selected positions spaced at measured increments within a given range of vertical movement, and means for locating the shiftable cutter head in a selected one of said positions governed automatically by the logs as the latter are fed into the machine, one of the conveyors being an in-feed conveyor mounted to occupy either of two levels, selectively, one elevated one of said increments above the other, means being provided operatively interconnected with said infeed conveyor acting automatically to position the same in one of its two said levels when the diameter of the log is an even number of said increments and to position the same in the other of its two said levels when the diameter of the log is an odd number of said increments.

11. In a log-cutting machine, means for conveying a log along an established travel path, a cutter head mounted alongside said travel path for movement between a retracted position inactive to a log being conveyed by the conveying means and advanced positions locating the head so that it will perform a prescribed chipping action upon the conveyed log, the cutter head having its cutter bitts so mounted and being so driven that the bitts take a climber cut, i.e. travel directively with the conveyed log as the bitts bite into the log, to produce chips of a uniform grain length in order to be suitable for the digesting process of a high-grade pulping operation, means operatively connected with the cutter head and controlled from a point remote thereto for shifting the cutter head to and releasably locking the same in a selected one of said advanced positions, the cutter head being so formed that its chipping action profiles the log into a rib having oppositely facing parallel sides, and means straddling the rib and bearing against said parallel faces to guide the conveyed log as it progresses beyond the cutter head.

12. A log-cutting machine as recited in claim 11 having saws acting upon the profiled log in course of its conveyed travel for cutting the log on parallel planes including the planes occupied by the parallel faces of the rib so as to produce dimensional lumber, the guide means straddling the rib and bearing against said parallel faces continuously throughout the period of the log's conveyed travel until the saws have completely reduced the profiled log to dimensional lumber.

13. The method of mill-processing a pulp log for maximum commercial return, comprising first chipping the log by cutter heads travelling longitudinally relative to the log and rotating in a climb-cut direction to produce pulp chips of a uniform grain length, the chips being taken from only the outside portion of the log in a manner correspondingly profiling the log at each side of its vertical diameter into steps which ascend above and descend below the horizontal diameter of the log with their riser faces paralleling the vertical diameter, and then reducing the profiled log to dimensional lumber by sawing the log longitudinally on the planes of the riser faces of said steps at least two of the riser faces which are produced by said profiling and which lie at opposite sides of said vertical diameter being employed as guide surfaces to hold the log against lateral displacement throughout substantially the entire period of the log's conveyed travel commencing as soon as the concerned riser faces take shape upon the leading end of the log.

14. In a log-cutting machine, means for conveying a succession of logs along an established travel path through a cutting station, a cutting means so formed and positioned at said cutting station that the same profiles each of the travelling logs to a progressively developing cant which is faced throughout the perimeter by meeting horizontal and vertical flats lying substantially normal one to the other, said cutting means comprising a plurality of cutter heads at least one of which is mounted for adjusting movement toward and from the path of travel of the logs so as to accommodate the cutting means to logs of different diameter, means for moving the cutting means to and releasably setting the same in adjusted position, and means made to operate automatically when one conveyed log is in the process of traversing the cutting station and as the leading end of a following conveyed log reaches a predetermined point spaced a moderate distance to the front of said cutting station for holding said following log in an arrested condition until said preceding log has cleared the cutting station.

15. The log-cutting machine of claim 14 in which said means for moving and setting the cutting means is governed automatically by conveyed logs in course of their travel to the cutting station.

16. In a log-cutting machine, means for conveying a log along an established travel path, a cutter head mounted alongside said travel path for movement between a retracted position inactive to a log being conveyed by the conveying means and advanced positions locating the head so that it will perform a prescribed chipping action upon the conveyed log, the cutter head having its cutter bitts so mounted and being so driven that the bitts take a climber cut, i.e. travel directively with the conveyed log as the bitts bite into the log, to produce chips of a uniform grain length in order to be suitable for the digesting process of a high-grade pulping operation, means operatively connected with the cutter head for shifting the cutter head to and releasably locking the same in a selected one of said advanced positions, and a sensing means operatively interconnected with said shifting means and activated automatically by a conveyed log in course of its travel toward the cutter head for operating the shifting means to cause the shifting means to shift the cutter head into a position properly correlated to the particular diameter of the log which activated the sensing means, means being provided making said sensing means active to the shifting means only when a preceding log which is traversing the cutting means has cleared the cutting means.

17. The method of mill processing a pulp log for maximum commercial return, comprising conveying the log along an established linear travel path, at a localized station traversed by the conveyed log as it travels said linear path subjecting the outer surface of the log to the chipping action of cutter heads rotating in a climb-cut direction to produce pulp chips of uniform grain length and by said chipping action profiling the travelling log to a progressively developing cant which is faced throughout the perimeter by meeting horizontal and vertical flats lying substantially normal one to the other, employing at each of the two sides of the conveyed cant, immediately following inception of said profiling action, a downwardly facing flat and its meeting outwardly facing flat as guide surfaces to positively hold the conveyed cant against either deviation from a linear travel endwise to its axis or turning about said axis, and at a localized station traversed by the conveyed profiled log as it travels said linear path producing dimensional lumber from the cant by sawing the same longitudinally on separated planes which are parallel one to the other and to flats of the cant, the use of said downwardly facing and outwardly facing flats of the cant as guide surfaces being continued without interruption from said point of its inception until the substantial completion of the sawing step.

18. The method of mill processing pulp logs for maximum commercial return, comprising feeding the logs one in following relation to another to the input end of an established linear travel path having a succession of localized processing stations, conveying the logs in succession along said travel path through said successive stations, in the course of the traversal by each conveyed log through a first one of said stations determining and registering the diameter of the concerned log, in the course of the traversal by each conveyed log through a second one of said stations subjecting the outer surface of the log to the chipping action of cutter heads rotating in a climb-cut direction to produce pulp chips of uniform grain length and by said chipping action profiling the travelling log to a progressively developing cant which is faced throughout the perimeter by meeting horizontal and vertical flats lying substantially normal one to the other, mounting said cutter heads for adjustment so that the heads can be located in positions producing from each log a cant whose widest span approximates the diameter of the log behind chipped, controlling the progress of the conveyed logs so that each log will have completed its traversal of said second station before a following log reaches such station, in the interval between completion of the profiling of each preceding log and inception of the profiling of a following log making said adjustment of the cutter heads automatically by recourse to the determined diameter previously registered for said following log, and in the course of the traversal by each conveyed profiled log through a third one of said stations producing dimensional lumber from the cant by sawing the same longitudinally on planes which are parallel to flats of the cant.

19. The method of mill processing a pulp log for maximum commercial return, comprising conveying the log along first and second established linear travel paths, at a localized station traversed by the conveyed log as it travels said first linear path subjecting the outer surface of the log to the chipping action of cutter heads rotating in a climb-cut direction to produce pulp chips of uniform grain length and by said chipping action profiling the travelling log to a progressively developing cant which is faced throughout the perimeter by horizontal and vertical flats lying substantially normal one to the other, employing at each of the two sides of the conveyed cant, immediately following inception and throughout the duration of said profiling action, a downwardly facing flat and an outwardly facing flat as guide surfaces to positively hold the conveyed cant against either deviation from a linear travel endwise to its axis or turning about said axis, and at a localized station traversed by the conveyed profiled log as it travels said second linear path producing dimensional lumber from the cant by sawing the same longitudinally on at least one plane which is spaced from and parallel with diametrically opposite flats of the cant, downwardly facing and outwardly facing flats at each of the two sides of the cant being also used as guide surfaces from said point of inception of the sawing step until the substantial completion thereof.

20. The method of mill processing pulp logs for maximum commercial return, comprising feeding the logs one in following relation to another to the input end of an established travel path having a succession of localized processing stations, conveying the logs in succession along said travel path through said successive stations, in the course of the traversal by each conveyed log through a first one of said stations determining and registering the diameter of the concerned log, in the course of the traversal by each conveyed log through a second one of said stations subjecting the outer surface of the log to the chipping action of cutter heads rotating in a climb-cut direction to produce pulp chips of uniform grain length and by said chipping action profiling the travelling log to a progressively developing cant which is faced throughout the perimeter by horizontal and vertical flats lying substantially normal one to the other, mounting said cutter heads for adjustment so that the head can be located in positions producing from each log a cant whose widest span approximates the diameter of the log being chipped, controlling the progress of the conveyed logs so that each log will have completed its traversal of said second station before a following log reaches such station, and in the interval between completion of the profiling of each preceding log and inception of the profiling of a following log making said adjustment of the cutter heads automatically by recourse to the determined diameter previously registered for said following log; and producing dimensional lumber from each cant by sawing the same longitudinally on at least one plane which is spaced from and parallel with diametrically opposite flats of the cant.

References Cited by the Examiner

UNITED STATES PATENTS

| 1,421,204 | 6/1922 | Fritz | 143—22 |
| 1,938,108 | 12/1933 | Morris | 144—3 |
| 3,082,802 | 3/1963 | Dickson et al. | 144—3 |

FOREIGN PATENTS

| 109,283 | 4/1928 | Austria. |
| 668,638 | 12/1938 | Germany. |
| 294,604 | 12/1938 | Great Britain. |
| 853,929 | 11/1960 | Great Britain. |

DONALD R. SCHRAN, *Primary Examiner.*